United States Patent

Redman

[11] Patent Number: 5,157,060
[45] Date of Patent: Oct. 20, 1992

[54] COATING COMPOSITION

[75] Inventor: Richard P. Redman, Reading, England

[73] Assignee: Imperial Chemical Industries PLC, London, United Kingdom

[21] Appl. No.: 218,442

[22] Filed: Jul. 12, 1988

Related U.S. Application Data

[63] Continuation of Ser. No. 930,927, Nov. 17, 1986, abandoned.

[30] Foreign Application Priority Data

Dec. 12, 1985 [GB] United Kingdom ............. 8530645

[51] Int. Cl.$^5$ .................. C08G 68/00; C08L 63/00; C25D 13/00
[52] U.S. Cl. .................. 523/400; 525/509; 528/248; 204/181.4
[58] Field of Search ............ 525/509; 528/254, 256; 523/400

[56] References Cited

U.S. PATENT DOCUMENTS

| | | | |
|---|---|---|---|
| 3,945,961 | 3/1976 | Blank | 525/509 |
| 4,036,795 | 7/1977 | Tominaga | 528/45 |
| 4,076,676 | 2/1978 | Sommerfeld | 260/29.4 R |
| 4,101,520 | 7/1978 | Boldizai | 525/509 |
| 4,102,847 | 7/1978 | Hartmann et al. | 260/31.4 R |
| 4,172,062 | 10/1979 | Sekmakos et al. | 525/509 |
| 4,174,333 | 11/1979 | Hartman et al. | 525/514 |
| 4,225,479 | 9/1980 | Hicks | 525/509 |
| 4,489,135 | 12/1984 | Drexler et al. | 428/423.1 |
| 4,515,926 | 5/1985 | Holubka | 525/449 |
| 4,543,144 | 9/1985 | Thoma et al. | 156/230 |
| 4,558,090 | 12/1985 | Drexler et al. | 524/591 |

FOREIGN PATENT DOCUMENTS 2102436A 2/1985 United Kingdom .

Primary Examiner—Thurman K. Page
Assistant Examiner—P. Kulkosky
Attorney, Agent, or Firm—Cushman, Darby & Cushman

[57] ABSTRACT

According to this invention we provide an aqueous coating composition, suitable for application to a cathodic substrate by electrodeposition, which comprises a dispersion in an aqueous medium in the presence of an amine-ionizing acid of cationically stabilized particles comprising:

(1) 50 to 84% by weight on the combined weight of (1), (2) & (3) of an amine-epoxide reaction product.
(2) 15 to 45% by weight based on the combined weight of (1), (2) & (3) of a blocked polyisocyanate as crosslinking agent; and
(3) 1 to 12% by weight based on the combined weights of (1), (2) and (3) of a highly methylolated, highly alkylated melamine-formaldehyde resin, wherein on average at least 4.0 of the reactive hydrogen atoms per triazine ring are methylolated, at least 3.5 of these methylol groups are alkylated and the alkylating group is selected from $C_{4-10}$ alkyl; the resin being substantially unreactive with the amine-epoxide-reaction product (1) at temperatures below 190° C.

9 Claims, No Drawings

COATING COMPOSITION

This is a continuation of application Ser. No. 06/930,927, filed Nov. 17, 1986, now abandoned.

This invention relates to coating compositions suitable for application to a cathodic article by electrodeposition; to a process of applying to an article such compositions by electrodeposition; and to improved composite coatings on an article.

It is known that aqueous dispersions of certain amine-epoxide reaction products are useful as film-forming components of coating compositions which are to be applied to a cathodic article by electrodeposition. U.S. Pat. No. 4,064,090, for example, describes the use of ionised salts of reaction products of (1) straight-chain diepoxides, (2) primary or secondary mono-amines and (3) diamines or primary mono-amines, together with a crosslinking agent, in the coating of cathodic articles by electrodeposition. The crosslinking agent is stated to be a compound which will react at normal paint stoving temperatures with the amine-epoxide reaction products to give a cross-linked insoluble coating film. The amine-epoxide reaction products are stated to contain at least four hydroxyl groups per molecule and to contain amine groups which are ionisable in the presence of specified acids. Crosslinking agents which are specifically mentioned in U.S. Pat. No. 4,064,090 include the phenol-formaldehyde condensates and the amino-plast resins such as the alkylated aldehyde-amine and aldehyde- amide condensates, for example the alkylated condensates of formaldehyde with urea, melamine and benzoguanamine.

Blocked polyisocyanates are also known (see for example Official Digest, February 1960 at pages 213-221) as crosslinking agents for amino group-containing polymers. In recent years the blocked polyisocyanates have found particular favour as cross-linking agents in coating compositions comprising an amine-epoxide reaction product containing amino and hydroxyl groups which are applied industrially by electrodeposition.

This type of composition is frequently applied by electrodeposition to steel automotive vehicle bodies to provide a primer coating. A further coating is then applied over the primer coating, usually after the primer coating has been crosslinked by stoving. This further coating may be the final coating or "topcoat" or it may be an intermediate coating to which a topcoat is applied subsequently. The resulting composite coating of primer, optional intermediate coating, and topcoat must protect from corrosion the steel body to which it has been applied as well as provide a pleasing appearance during the service life of the vehicle. One type of damage that can be caused to such a composite coating is that which is due principally to stones which become temporarily airborne on a highway as a result of the general passage of traffic and which then may cause chipping of the protective composite coating on individual vehicles which they strike. This chipping action may remove parts of the whole of the composite coating or, when adhesion between the primer and an overlayer is unsatisfactory, it may remove only an upper layer or layers. Both types of chipping are undesirable since in the former case there will be early corrosion of the steel substrate and in both cases a deterioration in appearance. Obviously it is desirable that the chips in the coating which penetrate through to the steel substrate are at a minimum, but it is also desirable that adhesion failure at an intermediate interface is also at a minimum in order to avoid a deterioration in appearance.

There are many factors which are relevant to the optimum performance of a coating on an article, such as a steel automotive body, and the formulation of a coating composition used to produce such a coating is usually a matter of compromise. We have found that in certain respects, for example the ability of a coating to protect sharp edges, the performance of a coating crosslinked by a polyisocyanate may be improved by increasing the level of usage of the polyisocyanate. However, at these higher levels of usage of the polyisocyanate there is a significant loss in adhesion between the primer coating applied by cathodic electrodeposition and a subsequently applied coating, more particularly a topcoat.

We have now found that at higher levels of usage of a blocked isocyanate crosslinking agent together with an amine-epoxide reaction product as the principal film-forming component of a primer coating composition to be applied to a metallic substrate by cathodic electrodeposition, the adhesion between the primer coating and a subsequently applied overcoating can be improved by incorporating into the primer coating composition a very specific type of melamine-formaldehyde resin which plays no significant part in the cross-linking of the amine-epoxide reaction product.

According to this invention we provide an aqueous coating composition, suitable for application to a cathodic substrate by electrodeposition, which comprises a dispersion in an aqueous medium in the presence of an amine-ionising acid of cationically-stabilised particles comprising:

(1) 50 to 84% by weight based on the combined weight of (1), (2) & (3) of an amine-epoxide reaction product.

(2) 15 to 45% by weight based on the combined weight of (1), (2) & (3) of a blocked polyisocyanate as crosslinking agent; and (3) 1 to 12% by weight based on the combined weights of (1), (2) and (3) of a highly methylolated, highly alkylated melamine-formaldehyde resin, wherein on average at least 4.0 of the reactive hydrogen atoms per triazine ring are methylolated, at least 3.5 of these methylol groups are alkylated and the alkylating group is selected from C4-10 alkyl; the resin being substantially unreactive with the amine-epoxide reaction product (1) at temperatures below 190° C.

The aqueous coating composition of the invention preferably also comprises other constituents, for example polymers such as addition copolymers which are preferably present in the disperse particle, solvents and pigments, and any ingredient conventionally used in coating compositions. Preferably there is also present in the disperse particles a hydroxyl-containing copolymer (4). One type of hydroxyl group-containing addition copolymer which may be present is described in our co-pending British Patent Application No. 85 09956. Another type of hydroxyl group-containing addition copolymer which may be present is a copolymer of hydroxyethylacrylate/hydroxy butyl acrylate.

The invention also provides a process of coating a cathodic conductive article immersed in a coating composition as defined above, by passing an electric current between the article and a counter-electrode.

The amine-epoxide reaction products are a well established class of polymeric materials which may be included in compositions suitable for application to an article by cathodic electrodeposition. They may also be termed amine-epoxide adducts. In general, there is always a reaction between at least one reactive hydrogen atom attached to a nitrogen atom and an epoxide group with the formation of a hydroxyl group. One type of amine-epoxide reaction product suitable in this invention is described in our co-pending British Patent Application No. 85 09955. The non-gelled amine-epoxide reaction products described in this co-pending application are obtained by co-reacting (A) a secondary amine $NHR_1R_2$, wherein $R_1$ & $R_2$, the same or different, may be $C_{1-18}$ alkyl or cycloalkyl, substituted alkyl or substituted cycloalkyl, or $R_1$, $R_2$ may represent, together with the N atom, a cyclic structure, optionally substituted; (B) a polyepoxide; (C) a polyoxyalkylene polyamine; & (D) a monoepoxide. The secondary amine (A) may be for example diethanolamine, N-methyl ethanolamine, diisopropanolamine or morpholine. The polyepoxide (B) may be, for example, one which is prepared by the etherification of a polyphenol with epichlorhydrin in the presence of an alkali. The polyphenol may be, for example, bis(4-hydroxyphenyl)-2, 2-propane. Suitable polyepoxides include those which are commercially available from Shell Chemicals under the Registered Trade Mark "Epikote", for example under the designations 1004 and 1007.

Suitable polyoxyalkylene polyamines (C) include the diamines and triamines which are commercially available from Jefferson Chemicals under the Registered Trade Mark "Jeffamine". A typical diamine is available as D-400 and a triamine as T-403, and these materials contain two or three primary amine groups respectively. Thus, particularly suitable polyoxyalkylene diamines have the general structure:

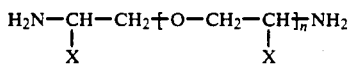

wherein X is hydrogen or $C_{1-16}$ alkyl, for example methyl and n is an integer in the range 1-50, preferably 2-40.

Suitable polyoxyalkylene triamines have the general structure:

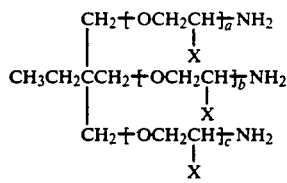

wherein X = hydrogen or $C_{1-6}$ alkyl for example methyl or ethyl and a +b +c =5.3 (approximately).

Preferably the polyamine has a molecular weight in the range 150-3000.

Suitable monoepoxides (D) include the glycidyl esters of carboxylic acids, for example the glycidyl ester of an acid in which the carboxyl group is attached to a tertiary $C_8$ alkyl group. "Cardura" E is a suitable commercially available monoepoxide.

Other details of suitable components (A), (B), (C) and (D) are mentioned in our co-pending application mentioned above and are included herein by this reference thereto.

Other amine-epoxide reaction products (1) which are suitable in this invention include those described in U.S. Pat. No. 4,064,090 and in U.S. Pat. No. 4,423,166.

Suitable blocked polyisocyanates (2) as crosslinking agents in the compositions and process of this invention include the commercially available mixtures of 2,4- and 2,6- toluene diisocyanate; diphenyl methane diisocyanate and the commercially available mixtures of diphenyl methane polyisocyanates which include di-, tri-and higher isocyanates, for example those commercially available as "Suprasec" DND and DNR; hexamethylene diisocyanate; and xylidine diisocyanate. In all of these the isocyanate groups have been reacted with a blocking agent, for example an alkoxy alcohol such as butyl carbitol or other suitable monohydroxy compound to render them inactive at room temperature but reactive at a temperature less than 190° C. with hydroxyl and amino groups, for example at 150° C. Derivatives of these polyisocyanates, for example dimers or trimers may be prepared for example by reaction with a polyol such as trimethylol propane.

The melamine-formaldehyde condensates (3) useful in the compositions and process of this invention are selected in accordance with the very specific criteria which have been defined above. They are also selected in accordance with a solvent-resistance test which illustrates, by the easy removal of an un-crosslinked film from a test panel, that their role in the invention is not as a crosslinking agent but as an additive which appears to have no effect on those properties of an ultimate coating which are normally associated with crosslinking; but clearly has an effect on other properties which are not normally associated with improved crosslinking.

The preferred melamine-formaldehyde resin is essentially monomeric, i.e. it is substantially free from self-condensed material, and is derived from melamine by substitution of at least 4.0 of the nominally 6 reactive hydrogen atoms in the triazine ring by reaction with formaldehyde and preferably by substitution of at least 4.35 of the reactive hydrogen atoms; and at least 3.5 of the methylol groups and preferably at least 3.75 of the methylol groups are alkylated to provide at least 3.5 —$CH_2OR$ groups per melamine entity.

In addition to the primary constituents (1), (2) and (3) of the disperse particles the aqueous coating composition also comprises an aqueous medium in which the particles are dispersed in the presence of an amine-ionising acid. The aqueous medium will usually comprise at least 70% by weight of water and may comprise also an organic liquid, for example an alkyl, e.g. butyl or hexyl, ether of ethylene glycol and propylene glycol, a lower alcohol or phenoxypropanol.

The acid may be inorganic, for example phosphoric acid, or organic, for example acetic, lactic, propionic or formic acid. Preferably there is present sufficient of the ionising acid to neutralise at least 25% of the amino groups present in the amine-epoxide reaction product. Preferably the ionising acid is lactic acid.

Preferred proportions of (1), (2) & (3) in the disperse particles are 55-70% of (1), 20-40% of (2) and 2-10% of (3).

Preferably the composition used in the electrodeposition process has a solids content in the range 10-30%.

The aqueous coating compositions of this invention comprise disperse particles, the particles comprising at least components (1), (2) & (3) described above. Preferably they comprise also a further component (4), an addition copolymer which comprises hydroxyl groups. The coating compositions may be prepared by several methods. In one preferred method the individual components are each separately prepared, for example in the presence of an organic diluent such as methyl ethyl ketone and are then combined together with other appropriate ingredients, such as cosolvent and ionising acid, and mixed with water under vigorous agitation to provide disperse particles in an aqueous medium. In another preferred method, for example as described in European Patent 69582 and U.S. Pat. No. 4,064,090 the components (1), (2) and (3) and the precursor monomers for addition copolymer (4) may be combined in disperse particles in an aqueous medium and the monomers subsequently polymerised.

The process of applying the above-defined coating compositions to a cathodic article is generally conventional, for example at temperatures in the range 20°-30° C. and at a voltage in the range 100-600 volts. It is generally preferred that a steel article, for example an automotive vehicle body, has been pretreated with a phosphate coating. The deposited coating is cured by heating the article to a temperature in the range 160°-190° C. and maintaining it at that temperature for a period of time in the range 15-30 minutes.

It has been stated earlier that coatings obtained on an article by cathodic electrodeposition when using the above compositions have improved adhesion to certain coatings which have been applied over them due to the presence of the M/F resin as additive. Over-coatings which are particularly preferred to achieve this improvement are alkyd resins which have been crosslinked with certain M/F resins.

Thus according to a further feature of this invention we provide a composite coating on an article which comprises (a) a first coating layer in contact with the article which has been obtained by the electrodeposition onto the cathodic article of a coating from a coating composition as defined above and by subsequently curing the coating thus obtained at a temperature of less than 190° C. and (b) a second coating layer in contact with the first coating layer which may be an intermediate layer or a topcoat layer.

A composite coating according to the invention can be distinguished from a composite coating otherwise similar but not containing the M/F additive, i.e. not according to the invention, by exposing each composite coating, produced on a metal panel, to the action of split metal balls. The composite coating according to the invention will exhibit less chipping due to loss of adhesion between the two coating layers than will the composite coating which is not according to the invention.

The invention is illustrated by the following Examples 2 and 17. Examples 1, 3-15 and 16 are included for comparative purposes. Parts and percentages are by weight unless otherwise stated.

EXAMPLES 1-15

These Examples illustrate the preparation of aqueous pigmented coating compositions which comprise as film-forming components an amine-epoxide reaction product a hydroxyl group-containing acrylic copolymer and, as crosslinking agent, a blocked polyisocyanate. They also illustrate the application of these compositions by electrodeposition to a cathodic article. Example 1 is a "control" experiment, whereas in Examples 2-15 there is present additionally an amine-aldehyde resin. Only in the case of Example 2 is the aqueous coating composition, and the method of its application, according to the present invention. The remaining Examples serve to illustrate the narrow scope of this invention with respect to the amine-aldehyde resin. (a), (b), (c), (d), (e) and (f) below describe the general method of preparation of the aqueous pigmented coating compositions and their application to a cathodic substrate. (g) below describes the method of mechanical testing of a composite coating which comprises a coating applied by electrodeposition either according to (Example 2) or not according to (Examples 1 & 3-15) the invention and a coating applied on top of such a coating which is of a type commercially recommended as a topcoat for metal automotive bodies.

(a) Preparation of the amine-epoxide reaction product 500 parts of the glycidyl ester of a $C_8$ tertiary alkyl carboxylic acid (commercially available from Shell Chemicals as "Cardura" E, "Cardura" being a Registered Trade Mark) were added to 880 5 parts of polyoxypropylene triamine of structure

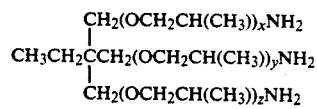

(commercially available from Jefferson Chemical Company as "Jeffamine" T-403, "Jeffamine" being a Registered Trade Mark); $x+y+z$ =approximately 5.3, and the approximate average molecular weight =403) contained in a flask fitted with a stirrer and thermometer and under a nitrogen blanket. The mixture was heated to 100° C. when an exotherm set in which raised the temperature to 140° C. The temperature was maintained for 1 hour at 140° C. after which the product had an epoxide value of zero and an amine value of 235 mg KOH/g.

1688 parts of an epoxy resin of epoxide functionality approximately 2 (commercially available as "Epikote" 1004; "Epikote" is a Registered Trade Mark;) were dissolved in 1126 parts of methyl isobutylketone in a flask fitted with a stirrer, a thermometer and a Dean and Stark water separator. The mixture was heated to the reflux temperature and any water in it was removed.

618 parts of the reaction product from (a) and 67 parts of N-methylethanolamine were added and the mixture maintained at the reflux temperature for 3 hours. The product had an epoxide value of 0.3 mg KOH/g and an amine value of 57.2 mg KOH/g. The solids content of the product was 68%.

(b) Preparation of the blocked isocvanate crosslinkinq agent 470 parts of a crude methylene diisocyanate (commercially available from ICI as "Suprasec" DND, "Suprasec" is a Registered Trade Mark), 30 0.144 parts of dibutyl tin laurate and 181 parts of methyl isobutyl ketone urethane grade were placed in a flask fitted with a stirrer, thermometer, dropping funnel and nitrogen blanket.

558 parts of butyl carbitol were added through the dropping funnel over 2 hours, allowing the temperature to rise from 30° C. to 100° C. The mixture was held at 100° C. for 5 hours. 250 parts of methyl isobutyl ketone and 9 parts of butanol were then added.

After a further ½ hour at 100° C. the product was cooled and it had an isocyanate value of zero and a solids content of 68%.

(c) Preparation of hydroxyl group-containing acrylic copolymer 11 parts of azobisisobutyronitrile were dissolved in a mixture of 255 parts of 4-hydroxy-n-butyl acrylate and 85 parts of butyl acrylate 30 containing 1.5 parts of octyl mercaptan. The mixture was passed over 3 hours into a flask containing 150 parts of methyl isobutyl ketone at the reflux temperature. Reflux was maintained for a further 1 hour, 0.7 parts of azobisisobutyronitrile in 3 parts of methyl isobutyl ketone were added and heating at the reflux temperature continued for a further 2 hours. The resulting solution (70% solids) of a 75/25 copolymer of 4-hydroxy-n-butyl acrylate/ butyl acrylate had a Gardner Holdt viscosity of v. The average molecular weight of the polymer (determined by gel phase chromatography) was about 12,000 and the free monomer content was less than 0.5% as determined by gas-liquid chromatography.

(d) Preparation of an aqueous emulsion of the film-forming components of the coating composition 450 parts of the reaction product from (a), 90 parts of the acrylic copolymer from (c) and 250 parts of the crosslinking agent from (b) were mixed with 15 parts of phenoxy propanol, 25 parts of 80% aqueous lactic acid "X" parts of an amine-aldehyde resin (see Table 1), and 25 parts of 80% aqueous lactic acid. 1200 parts of demineralised water were then added to the mixture using a high-shear "Silverson" mixer ("Silverson" is a Registered Trade Mark). The volatile solvents were removed from the emulsion by distillation under reduced pressure and the solids content adjusted to 20%.

(e) Preparation of an aqueous pigment millbase

A pigment dispersant was prepared as follows:
1356 parts of an epoxy resin of average epoxide functionality 2 commercially available as "Epikote" 1001 ("Epikote" is a Registered Trademark of Shell Chemicals) were dissolved in 2334 parts of dipropylene glycol methyl ether by stirring at 100° C.

876 parts of a reaction product prepared from 2000 parts of a linear polyoxypropylene diamine of molecular weight 400 having terminal primary amino-containing groups of structure

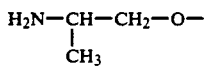

(commercially available from Jefferson Chemical Company as "Jeffamine" D400 and 1250 parts of the glycidyl ester of a $C_8$ tertiary alkyl carboxylic acid (commercially available from Shell Chemicals as "Cardura" E), and 102 parts of N-methyl ethanolamine were then added and the mixture maintained at 110° C. for 2 hours, then at 120° C. for 1 hour.

After this time the epoxy value had fallen to zero. The amine value was 1.78 millimoles/g (100% solids).

The solution was cooled and 325 parts of 80% lactic acid solution were added.

A ball mill of 1-litre nominal volume was charged with a pigment slurry comprising :

|  | Parts |
|---|---|
| Pigment dispersant as described in (a) above | 41 |
| Demineralised water | 151 |
| Carbon black | 2 |
| Basic lead silicate | 5 |
| China clay | 82 |
| Titanium dioxide | 86 |
| Dibutyl tin oxide catalyst | 6 |

The pH of the slurry was adjusted to 5.5 by adding lactic acid. The standard weight of steatite balls was added and the mill run for 16 hours. At the end of this time the pigment was well dispersed and had a fineness value of Hegman No.7. A further 41 parts of the pigment dispersant, 20 parts of dipropylene glycol methyl ether, 20 parts of water and 2 parts of white spirit as anti-foaming agent were added to the ball mill. After grinding for a further 30 minutes the mill-base was run off through a strainer and produced a yield of 322 parts. It had a fineness value of Hegman No. 7.

(f) Preparation of a pigmented coating composition and its application by electrodeposition 2660 parts of the emulsion prepared in (d) above were mixed with 330 parts of the millbase from (e) above. The resulting composition was stirred for 16 hours. The pH of the composition was 5.8 and its conductivity 2000 s cm$^{-1}$. A phosphated steel panel as cathode was coated by electrodeposition at 320 volts for 2½ minutes using this composition at a bath temperature of 28° C. The panel was removed, rinsed with demineralised water and stoved at 180° C. for 20 minutes. The coating was smooth and of moderate gloss.

(g) Preparation and mechanical testing of a composite coating

The coated steel panels obtained in (f) above were further coated by spraying the primer coating with a commercially available non-aqueous coating composition comprising an alkyd resin and a melamine/formaldehyde crosslinking agent. The panels were then stoved at 135° C. for 20 minutes. Each panel, having a composite coating was subjected to the following test, and a chip rating and an intercoat adhesion rating was obtained for each coating.

Five lots, each of 500 g, of split steel shot were directed onto each of the coated panels using compressed air at 3 bar. The panels were mounted at 45° C. to the direction of movement of the shot and the shot covered a panel area of about 8 cm×8 cm. Chipping of the coating was induced, some chips reaching to the steel substrate and others only reaching the primer coating layer i.e. in the latter case there had been intercoat adhesion failure. To highlight the failures down to metal the steel panels were dipped into 5% acidified copper sulphate solution for 10 minutes. After rinsing, the chips which reached the metal were apparent as bright copper spots. The total chip failure was then visually assessed as a Chip Rating using a scale of 1–4 (increasing severity - ). The chipping, i.e. the failure in adhesion, which occurred between the primer and topcoat layers, was also assesed visually. The chipping which occurred due to this adhesion failure was compared with the chipping which reached to the metal substrate and was expressed as a percentage ratio of the two types of chipping (see Table 2).

EXAMPLE 16

This Example illustrates the inability of the very specific type of melamine-formaldehyde resin used in this invention to cross-link the amine-epoxide reaction product component (1) of the composition.

In Example 2 above the stoved steel panel having an electrodeposited coating as referred to in (f) was subjected to vigorous rubbing with a cloth saturated with methylethyl ketone. The film was not marked after 100 double rubs.

The procedure of Example 2 up to (f) was repeated except that the 250 parts of blocked isocyanate were replaced by 235 parts of "Cymel" 1156. The resulting steel test panel was rubbed in the same manner as just described for the panel of Example 2. After 5 rubs the coating was completely removed. This clearly indicates that the specific type of melamine-formaldehyde resin used in this invention does not crosslink the amine-epoxide reaction product component (1).

EXAMPLE 17

This Example illustrates the use of a coating composition according to the invention in which the procedure of Example 2 was repeated but the 90 parts of acrylic copolymer of (c) was omitted and the amount of the melamine/formaldehyde resin (Cymel 1156) was increased from 60 parts to 120 parts. The test results corresponding to (g) with panels which employed this composition were the same as for Example 2 in Table 2.

TABLE 1

AMINE-ALDEHYDE RESINS USED IN EXAMPLES 1-15

"X" PARTS OF COMMERCIALLY AVAILABLE AMINE-ALDEHYDE RESIN (constant 60 parts by weight 100% solids) AMINE-ALDEHYDE RESIN

| EXAMPLE No. | X | TYPE | —N—H CONTENT | PROPORTION OF —N(CH$_2$OR) | R | COMMERCIAL NAME |
|---|---|---|---|---|---|---|
| 1 | — | — | — | — | — | — |
| 2 | 60 | melamine | low | high | butyl | Cymel 1156 |
| 3 | 61 | melamine | low | medium | methyl | Cymel 350 |
| 4 | 74 | melamine | low | low | methyl | Cymel 380 |
| 5 | 70 | (benzoguanamine | low | high | methyl/ethyl | Cymel 1125 |
| 6 | 61 | melamine | low | high | methyl/butyl | Cymel 1130 |
| 7 | 60 | melamine | low | high | methyl | Cymel 303 |
| 8 | 74 | melamine | high | high | methyl | Cymel 325 |
| 9 | 60 | melamine | low | high | methyl/ethyl | Cymel 1116 |
| 10 | 74 | melamine | high | high | butyl | Cymel 1158 |
| 11 | 61 | glycoluril | low | high | butyl | Cymel 1170 |
| 12 | 61 | glycoluril | low | high | methyl/ethyl | Cymel 1171 |
| 13 | 130 | glycoluril | low | very low | ? | Cymel 1172 |
| 14 | 61 | urea | low | high | butyl | UFR 80 |
| 15 | 61 | urea | low | medium | methyl | UFR 60 |

"Cymel" is a Registered Trade Mark of American Cyanamid Company
"UFR" is a Trade Mark of American Cyanamid Company

TABLE 2

| EX-AMPLE No. | MECHANICAL TESTING DATA | |
|---|---|---|
| | CHIP RATING (Total chipping) | PENETRATION OF CHIPS (%) To Substrate:To Primer |
| 1 | 4 | 10:90 |
| 2 | 1.5 | 50:50 |
| 3 | 3 | 30:70 |
| 4 | 3 | 30:70 |
| 5 | 4 | 20:80 |
| 6 | 4 | 20:80 |
| 7 | 4 | 10:90 |
| 8 | 4 | 10:90 |
| 9 | 4 | 10:90 |
| 10 | 4 | 10:90 |
| 11 | 4 | 10:90 |
| 12 | 4 | 10:90 |
| 13 | 4 | 10:90 |
| 14 | 4 | 10:90 |
| 15 | 4 | 10:90 |

We claim:

1. In an aqueous cathodic electrodepositable primer coating composition which is a dispersion in an aqueous medium, and in the presence of an amine-ionizing acid, of cationically-stabilized particles consisting essentially of:

(1) 50 to 84% by weight, based on the combined weight of (1), (2) and (3), of an amine-epoxide reaction product and (2) 15 to 45% by weight based on the combined weights of (1), (2) and (3) of a blocked polyisocyanate as crosslinking agent; the improvement which consists in including in said dispersion a material which is not reactive with the amine-epoxide reaction product and which improves adhesion between a primer coating derived by electrodeposition of said primer coating composition and a subsequently applied overcoating, said material consisting of (3) 1 to 12% by weight based on the combined weights of (1), (b 2) and (3) of a highly methlolated, highly alkylated malamine-formaldehyde resin wherein on average at least 4.0 of the reactive hydrogen atoms per triazine ring are methylolated, at least 3.5 of these metholol groups are alkylated and the alkylating group is selected from $C_{4-10}$ aklyl, the resin being substantially unreactive with the amine epoxide reaction product (1) at temperatures below 190° C.

2. A coating composition according to claim 1 wherein the melamine-formaldehyde resin is substantially monomeric.

3. A composition according to claim 2 where the resin is derived from melamine by substitution at least 4.35 of the nominally 6 reactive hydrogen atoms in the triazine ring by reaction with formaldehyde.

4. A coating composition according to claim 1 wherein the disperse particles also comprise an additional copolymer (4) comprising hydroxyl groups.

5. A composition according to claim 1 wherein the amine ionizing acid is selected from the group consisting of phosphoric, acetic, lactic, propionic and formic acids.

6. A composition according to claim 1 wherein there is present sufficient ionizing acid to neutralize at least 25% of the amino groups present in the amine-epoxide reaction products.

7. A composition according to claim 1 wherein the proportions of (1), (2) and (3) in the disperse particles are 55-75% of (1), 20-40% of (2) and 2-10% of (3).

8. A composition according to claim 1 having a solids content of 10-30%.

9. A method of coating an article by electrodeposition which comprises immersing the article in a coating composition according to claim 1 and passing an electric current between the article as a cathode and a counter-electrode.

* * * * *